United States Patent
Akkaya et al.

(10) Patent No.: US 10,917,626 B2
(45) Date of Patent: Feb. 9, 2021

(54) ACTIVE ILLUMINATION 3D IMAGING SYSTEM

(71) Applicant: Microsoft Technology Licensing, LLC., Redmond, WA (US)

(72) Inventors: Onur Can Akkaya, Palo Alto, CA (US); Arrigo Benedetti, San Franciso, CA (US); Cyrus Bamji, Freemont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/359,643

(22) Filed: Nov. 23, 2016

(65) Prior Publication Data

US 2018/0146186 A1    May 24, 2018

(51) Int. Cl.
| | |
|---|---|
| *H04N 13/254* | (2018.01) |
| *H04N 13/282* | (2018.01) |
| *H04N 13/296* | (2018.01) |
| *G01B 11/25* | (2006.01) |
| *G01S 1/00* | (2006.01) |
| *H04N 5/232* | (2006.01) |
| *G01S 7/497* | (2006.01) |
| *G01S 7/481* | (2006.01) |
| *G01S 17/42* | (2006.01) |
| *G01S 17/89* | (2020.01) |
| *G01S 17/10* | (2020.01) |
| *G01S 17/36* | (2006.01) |

(52) U.S. Cl.
CPC ....... *H04N 13/254* (2018.05); *G01B 11/2513* (2013.01); *G01S 1/00* (2013.01); *G01S 7/4815* (2013.01); *G01S 7/4817* (2013.01); *G01S 7/497* (2013.01); *G01S 17/42* (2013.01); *G01S 17/89* (2013.01); *H04N 5/232* (2013.01); *H04N 13/282* (2018.05); *H04N 13/296* (2018.05); *G01S 17/10* (2013.01); *G01S 17/36* (2013.01)

(58) Field of Classification Search
CPC ....................... H04N 13/0253; H04N 13/0221
USPC .......................................................... 348/50
See application file for complete search history.

(56) References Cited

U.S. PATENT DOCUMENTS 6,166,384 A * 12/2000 Dentinger ............... G06T 5/002
                                                              250/370.08
7,673,803 B2    3/2010 Tsikos et al.
(Continued)

FOREIGN PATENT DOCUMENTS

DE    202013101039 U1    3/2014
EP        3010223 A1     4/2016
(Continued)

OTHER PUBLICATIONS

Zhang, et al., "Real-Time High Resolution 2D-plus-Depth Video Generation Using Time-of-Flight Sensor", In Proceedings of the 7th International Conference on Internet Multimedia Computing and Service, Aug. 19, 2015, 5 pages.
(Continued)

*Primary Examiner* — Jerry T Jean Baptiste (57) ABSTRACT

An active illumination range camera operable to determine distances to features in a scene, and comprising an illumination system and imaging system simultaneously controllable to provide a FOI and a FOV that coincide at, and are substantially coextensive with, a region of interest (ROI) in a portion of the scene and track the ROI as it moves.

21 Claims, 4 Drawing Sheets

(56) References Cited

U.S. PATENT DOCUMENTS

| | | |
|---|---|---|
| 8,326,084 B1 | 12/2012 | Marrion et al. |
| 8,587,773 B2 | 11/2013 | Bamji et al. |
| 8,761,594 B1 | 6/2014 | Gross et al. |
| 8,934,087 B1 | 1/2015 | Stobie et al. |
| 9,170,097 B2 | 10/2015 | Keshavmurthy et al. |
| 9,182,491 B2 | 11/2015 | Dorrington et al. |
| 9,229,583 B2 | 1/2016 | Spears |
| 9,285,894 B1 | 3/2016 | Wang et al. |
| 9,528,819 B2 | 12/2016 | Herschbach |
| 2002/0154812 A1* | 10/2002 | Chen .................. G06T 7/30 382/154 |
| 2004/0114921 A1 | 6/2004 | Braun et al. |
| 2010/0226114 A1 | 9/2010 | Fishbaine |
| 2010/0290674 A1* | 11/2010 | Kim .................. G01S 7/483 382/106 |
| 2012/0086781 A1 | 4/2012 | Iddan et al. |
| 2012/0154535 A1 | 6/2012 | Yahav et al. |
| 2012/0326959 A1 | 12/2012 | Murthi et al. |
| 2013/0027581 A1* | 1/2013 | Price .................. H04N 5/2353 348/229.1 |
| 2013/0293722 A1* | 11/2013 | Chen .................. F21V 14/04 348/164 |
| 2014/0049609 A1 | 2/2014 | Wilson et al. |
| 2014/0333728 A1 | 11/2014 | Navab et al. |
| 2014/0333770 A1* | 11/2014 | Baur .................. B60R 1/12 348/148 |
| 2015/0195490 A1* | 7/2015 | Oyman .............. H04L 65/1083 348/14.02 |
| 2016/0026857 A1 | 1/2016 | Petyushko et al. |
| 2016/0041266 A1 | 2/2016 | Smits |
| 2016/0080673 A1* | 3/2016 | Zhang .................. H04N 5/2354 348/308 |
| 2016/0182891 A1 | 6/2016 | Ko et al. |
| 2016/0182895 A1 | 6/2016 | Ko et al. |
| 2017/0064209 A1* | 3/2017 | Cohen ................ H04N 5/23296 |
| 2017/0142353 A1 | 5/2017 | Tadmor et al. |
| 2018/0176492 A1 | 6/2018 | Bamji et al. |
| 2019/0019302 A1 | 1/2019 | Akkaya et al. |
| 2019/0385321 A1 | 12/2019 | Akkaya et al. |

FOREIGN PATENT DOCUMENTS

| | | |
|---|---|---|
| WO | 2014149702 A1 | 9/2014 |
| WO | 2017112416 A1 | 6/2017 |

OTHER PUBLICATIONS

Hach, et al., "A novel RGB-Z camera for high-quality motion picture applications", In Proceedings of the 10th European Conference on Visual Media Production, Nov. 6, 2013, 10 pages.

Kadambi, et al., "Coded time of flight cameras: sparse deconvolution to address multipath interference and recover time profiles", In Journal of ACM Transactions on Graphics, vol. 32, Issue 6, Nov., 2013, 10 pages.

Ben-Ezra, Moshe, "Video Super-Resolution Using Controlled Subpixel Detector Shifts"; IEEE Transactions on Pattern Analysis and Machine Intelligence, vol. 27, No. 6, 2005, pp. 977-987.

Kirmani, Ahmed et al., "Spumic: Simultaneous Phase Unwrapping and Multipath Interface Cancellation in the Time-of-Flight Cameras using Spectral Methods"; Department of Electrical Engineering and Computer Science at MIT, Conference Paper (IEEE Int'l Conf. on Multimedia & Expo (ICME) 2013.

"Non-Final Office Action Issued in U.S. Appl. No. 15/646,124", dated Jan. 23, 2019, 5 Pages. 5 Pages.

Hahne, et al., "Depth Imaging by Combining Time-of-flight and On-demand Stereo", In Proceedings of Workshop on Dynamic 3D Imaging, Sep. 9, 2009, 14 Pages.

Ito, et al., "System Design and Performance Characterization of a MEMS-Based Laser Scanning Time-of-Flight Sensor Based on a 256 × 64-pixel Single-Photon Imager", In Journal of IEEE Photonics Society, vol. 5 Issue 2, Apr. 1, 2013, 15 Pages.

Niclass, et al., "Design and Characterization of a 256×64-pixel Single-Photon Imager in CMOS for a MEMSbased Laser Scanning Time-of-flight Sensor", In Journal of Optics Express. vol. 20, Issue 11, May 21, 2012, pp. 11863-11881.

"International Search Report and Written Opinion Issued in PCT Application No. PCT/US18/034531", dated Aug. 17, 2018, 13 Pages.

"Non Final Office Action Issued in U.S. Appl. No. 16/558,027", dated May 12, 2020, 6 Pages.

* cited by examiner

ACTIVE ILLUMINATION 3D IMAGING SYSTEM

BACKGROUND

An active illumination range camera comprises a light source that it controls to transmit light to illuminate features in a scene that the camera images, and comprises a photosensor having pixels on which it registers light that the features reflect from the transmitted light back to the camera. The range camera processes reflected light from the features that pixels in the photosensor register to provide measures of distances to the features in the scene. In a time of flight (TOF) range camera the camera processes reflected light from a feature that a pixel registers to determine a round trip flight time of light from the camera to the feature and back to the camera. The range camera determines a measure of a distance of the feature from the camera based on the round trip flight time and the speed of light. A TOF range camera may be a gated TOF (GT-TOF) range camera or a "continuous wave" TOF (CW-TOF) range camera. In an active illumination range camera based on stereo methods, the camera provides measures of distances to features in the scene by determining binocular disparity for the features responsive to the transmitted light imaged on the pixels that the features reflect back to the camera. The camera triangulates the features based on their respective disparities to determine measures of distances to the features. A range camera may provide measures of distances to features in a scene that the camera images in an image of the scene referred to as range image.

SUMMARY

An aspect of an embodiment of the disclosure relates to providing an active illumination range camera comprising an imaging system controllable to configure and determine a direction of a FOV of the camera, an illumination system controllable to configure and determine a direction of a field of illumination (FOI) of the camera, and a controller. The controller is configurable to control the imaging and illumination systems to illuminate and image selectively different portions of a scene to acquire an image of the scene that comprises more than one portion. Optionally the images of the different portions are imaged on pixels of a same photosensor included in the imaging system and read out from the photosensor in a same frame, or read out in different frames of the photosensor. In an embodiment, the controller may be configurable to identify a region of interest (ROI) in a scene that the camera images. The controller may control the imaging and illumination systems to image the ROI using a reduced FOV, which includes only a portion of the scene in which the ROI is located, and a matching FOI that illuminates at the scene, optionally, substantially only the FOV. The controller may operate to detect motion of a feature of interest located in the ROI and adjust direction of the reduced FOV and matching FOI to track the feature of interest as it moves to acquire additional images of the ROI for which, optionally, the feature of interest is relatively stationary with respect to the reduced FOV. In an embodiment, the controller may control the imaging and illumination systems to acquire a plurality of images of a scene from slightly different poses of the range camera and process the images to provide a super-resolution range image of the scene. First and second camera poses are slightly different if an image of a feature of a scene imaged by the camera in a first image acquired from the first pose is displaced by a distance less than a pixel pitch in a second image of the scene acquired from the second pose.

In an embodiment the active illumination range camera may comprise any one or any combination of more than one of a continuous wave (CW) TOF range camera, a gated TOF range camera, and/or a stereo range camera.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Figure 1:
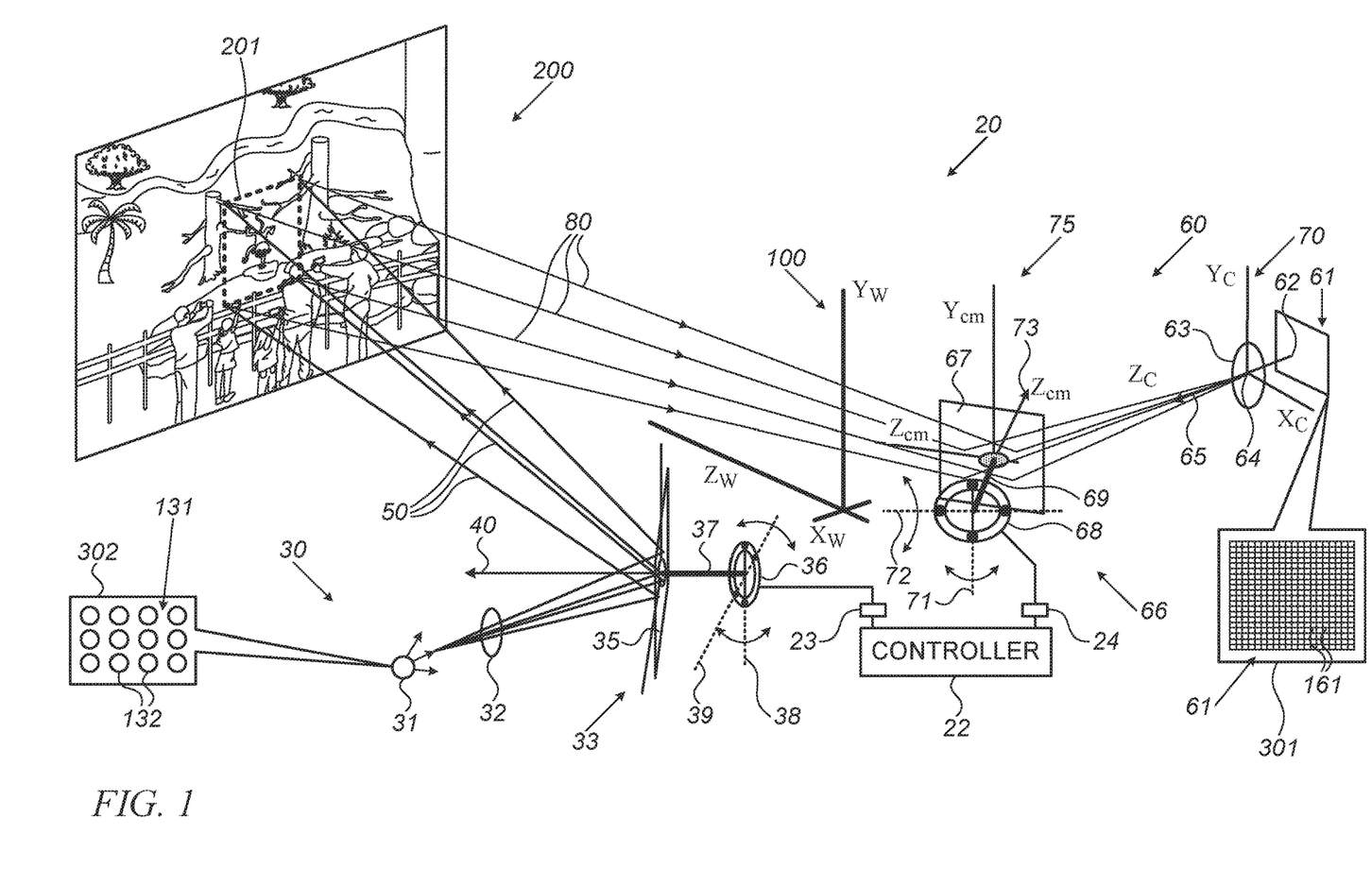
FIG. 1 schematically shows an active illumination range camera imaging a scene using a FOI that substantially coincides with the FOV of the camera, in accordance with an embodiment of the disclosure.

In the detailed discussion below features of a range camera, the range camera's imaging and illuminating systems, and a FOV and a FOI that the systems respectively generate are shown in, and discussed with reference to FIG. 1. In the figure the range camera is shown imaging a scene with the camera FOV and FOI having substantially a same size at the scene and substantially coincident at the scene. Operation of the range camera in a region of interest (ROI) focusing mode and in a co-scanning mode are discussed with reference to the figure. In the ROI focusing mode the range camera identifies a ROI in a scene and images the ROI using a reduced FOV, which includes only a portion of the scene in which the ROI is located, and a matching FOI that illuminates at the scene, optionally, substantially only the FOV. In the co-scanning mode the coincident FOV and FOI are simultaneously scanned across the scene together to illuminate and image portions of the scene on the camera photosensor. Operating in the co-scanning mode the camera may readout the imaged portions in different frames of the photosensor and stitch the imaged portions to provide a complete image of the scene. The range camera shown in FIG. 1 is discussed operating in a spotlight mode schematically shown in FIGS. 2A and 2B. In the spotlight mode the range camera imaging system is controlled to have a FOV that encompasses all, or a relatively large part of a scene it is desired to image using the camera. The illuminating system is controlled to scan the scene with a FOI having a size that illuminates only a portion of the scene encompassed by the FOV to sequentially illuminate, optionally in a raster-like scanning pattern, different portions of the scene. The imaging system is controlled to image portions of the scene on pixels of the camera photosensor when the portions are illuminated by the illumination system to acquire a complete range image of the scene on the photosensor. The camera may read out the imaged portions in a single frame of the photosensor.

By controlling and directing a FOV and/or a FOI of a range camera in accordance with an embodiment of the disclosure to substantially coincide at a scene and sequentially illuminate and image different portions of the scene, a relatively small photosensor may be used to image a scene for which a substantially larger photosensor might be required to simultaneously image all of the scene. And because at any one time only a portion of the scene is imaged, an instantaneous light output power that the illumination system may be required to provide to advantageously illuminate and image the scene may be substantially reduced. Or, for a given power output of the illumination system, to an extent that the portions of the scene that are imaged are smaller, intensity of illumination of a given imaged portion is greater and an exposure period of the photosensor to image the portion may be reduced. Reducing the exposure period operates to reduce the effects of ambient light and moderate image blur. Additionally, by imaging portions of a scene which are smaller than the complete scene light that the range camera collects to image the portions is generally less affected by multipath propagation. As a result a range image of the portion and of the scene comprising the image of the portion may be characterized by enhanced signal to noise ratio (SNR).

Figure 3:
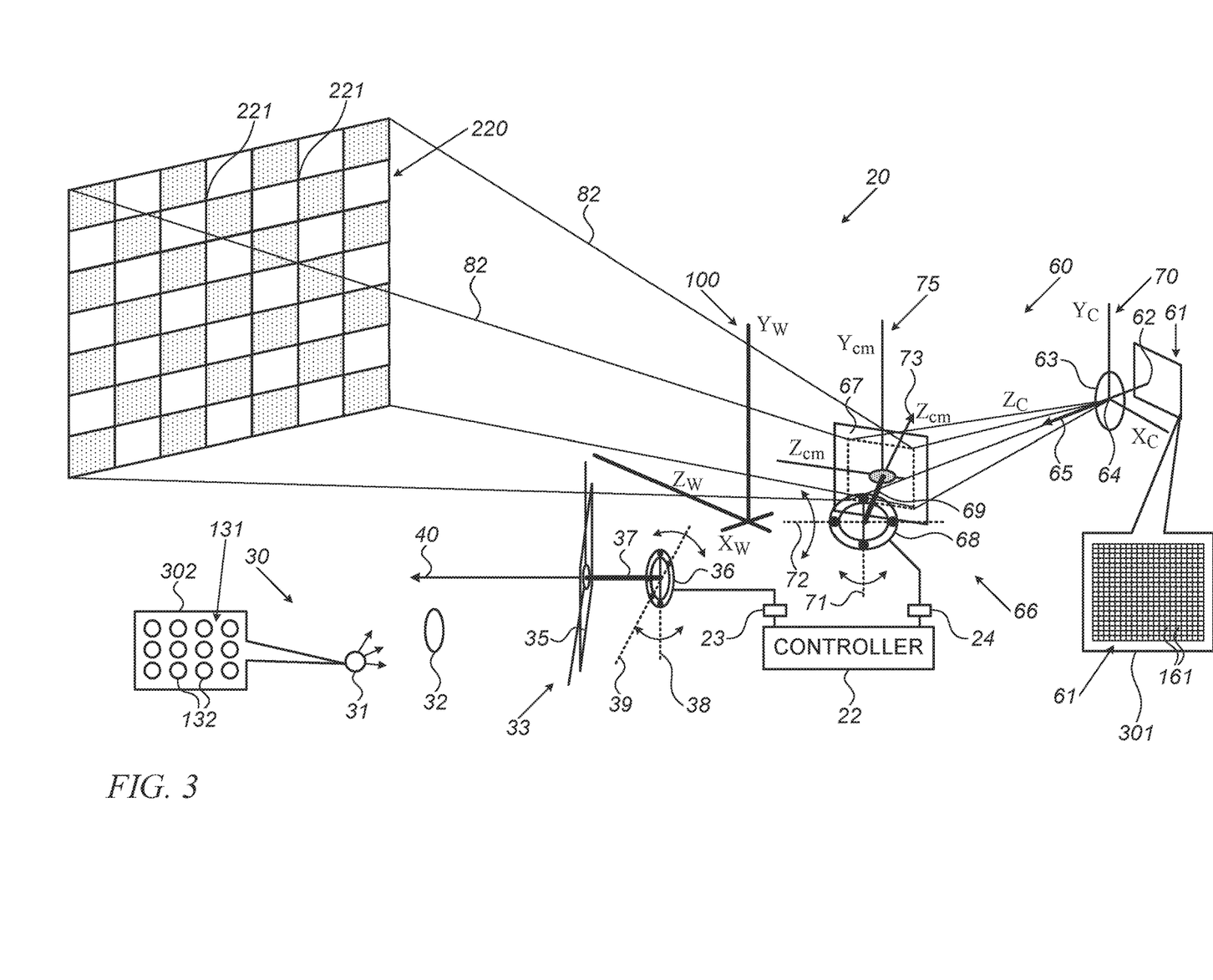
FIG. 3 schematically shows the active illumination range camera in FIG. 1 imaging a calibration target to calibrate the camera and correlate directions of FOVs of the camera with signals that are used to control the imaging system of the camera that provides the FOV, in accordance with an embodiment of the disclosure.

FIG. 3 schematically shows the range camera shown in FIG. 1 imaging a calibration target to calibrate the camera imaging and illumination systems with a controller that controls the systems In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

FIG. 1 schematically shows an active illumination range camera 20 comprising an illumination system 30 and an imaging system 60 in accordance with an embodiment of the disclosure. A controller 22 controls components of illumination and imaging systems 30 and 60. Range camera 20 may be any of various active illumination range cameras, and may for example comprise any one or any combination of more than one of a GT-TOF range camera, CW-TOF range camera, and/or a stereo range camera. Relative locations and orientations of illumination and imaging systems 30 and 60, their respective components, and a scene that range camera 20 images, may be referenced by coordinates of a "world" coordinate system 100. Coordinate system 100 is optionally a Cartesian coordinate system having axes $X_W$, $Y_W$, and $Z_W$. In FIG. 1 by way of example, range camera 20 is shown imaging a scene 200 at a zoo.

Controller 22 may comprise any electronic and/or optical processing and/or control circuitry, to provide and enable functionalities that the controller may require to support its operation in embodiments that are described below and embodiments similar to the described embodiments. By way of example, controller 22 may comprise a processor (not shown) having any one, or any combination of more than one of, a microprocessor, an application specific circuit (ASIC), field programmable array (FPGA) and/or system on a chip (SOC). The controller may comprise a memory (not shown) having any electronic and/or optical circuitry suitable for storing data and/or computer executable instructions and may, by way of example, comprise any one or any combination of more than one of a flash memory, random access memory (RAM), read only memory (ROM), and/or erasable programmable read-only memory (EPROM).

Illumination system 30 may comprise a light source 31, an optical system represented by a lens 32, and a FOI beam steerer 33 that cooperate to produce and configure a desired FOI of light and direct the FOI in a desired direction to illuminate a scene imaged by range camera 20. In FIG. 1 illumination system 30 is shown providing a FOI schematically outlined by bounding lines 50 and directed to illuminate a central, optionally rectangular, region 201 of zoo scene 200.

Light source 31 comprises at least one light producing element such as a laser or light emitting diode (LED). Optionally, light source 31 comprises an array 131 of light producing elements 132, such as VCSELs (vertical cavity surface emitting lasers) schematically shown in an inset 302 that are individually controllable to shape a beam of light from the light source. In an embodiment light producing elements 132 may be turned on and off to relatively rapidly shift a direction of a FOI provided by illumination system 30 between discrete illumination directions. Light source 31 is configured for generating, optionally IR (infrared) light, suitable for use with a type of range camera to which range camera 20 belongs. For example, if range camera 20 operates as a stereo range camera, light source 31 may be configured to illuminate a scene imaged by the camera with structured light, such as, optionally, a textured light pattern. If range camera 20 operates as a TOF range camera, light source 31 may be controllable to generate temporally modulated light for illuminating a scene that is imaged by the camera. If operating as a GT-TOF range camera, light source 31 of range camera 20 may be configured to generate a train of short light pulses for illuminating a scene. If range camera 20 operates as a CW-TOF range camera, light source 31 may be configured to generate a continuous wave of time modulated light for illuminating a scene. The CW-TOF camera determines distances to features in the scene based on phase shifts of light that the features reflect from the transmitted light relative to the modulation of the transmitted light. For convenience of presentation range camera 20 may be considered to be a CW-TOF range camera.

Optical system 32 may comprise a collimating lens and diffuser (not shown) that receives and shapes light from light source 31 to provide a desired FOI, such as FOI 50, and transmits the light to FOI steerer 33. FOI beam steerer 33 is controllable to selectively steer the light that it receives so that it illuminates a region of a scene imaged by range camera 20 that is substantially coextensive with the FOV of the range camera.

FOI beam steerer 33 may comprise any one or any combination of more than one, of various light steering elements such as, liquid crystal gratings, electrowetting prisms, conventional micro-sized mirrors, and/or micromirror arrays. By way of example, FOI beam steerer 33 is schematically shown comprising a FOI mirror 35 mounted to a FOI gimbal 36 by a suitable mechanical structure represented by a coupling arm 37. Controller 22 may control a gimbal motion controller 23 to rotate FOI mirror 35 about a pan axis 38 and a tilt axis 39 to point a normal 40 to the FOI mirror in a desired direction, and thereby to orient mirror 35 in a direction for which the mirror reflects light from light source 31 in a desired direction—which by, way of example in FIG. 1, is a direction that illuminates region 201 of zoo scene 200. Pan and tilt rotation angles of gimbal 36 about pan and tilt angle axes 38 and 39 respectively to which it is desired to set pan and tilt angles of gimbal 36 may be referred to as mirror pan and tilt "set" angles.

In an embodiment, motion controller 23 optionally comprises pan and tilt angle sensors (not shown) coupled to gimbal 36 and piezoelectric motors (not shown) that are friction coupled to gimbal 36 and operable to rotate the gimbal. The pan and tilt angle sensors generate pan and tilt sensor position signals that provide measures of pan and tilt angle positions of gimbal 36 and FOI mirror 35 about pan and tilt axes 38 and 39 respectively. Optionally, motion controller 23 comprises PID (Position-Integral-Derivative) controllers (not shown). The PID controllers control the piezoelectric motors to rotate gimbal 36, and thereby FOI mirror 35, to desired pan and tilt set angles about pan and tilt axes 38 and 39 respectively, responsive to the desired FOI mirror pan and tilt set angles and sensor position signals provided by the pan and tilt angle sensors coupled to gimbal 36.

In an embodiment, controller 22 may be configured to receive, optionally digital, FOI pan and tilt set angle input signals, which respectively define FOI mirror 35 pan and tilt set angles at which it is desired to orient FOI mirror 35. In response to receiving the pan and tilt set angle input signals, controller 22 may transmit corresponding pan and tilt control signals to gimbal motion controller 23. The received pan and tilt control signals define sensor position signals, which motion controller 23 is expected to receive from the pan and tilt angle sensors coupled to gimbal 36 when the gimbal and FOI mirror 35 are properly oriented at the desired FOI pan and tilt set angles. In response to receiving the pan and tilt control signals, motion controller 23 rotates FOI gimbal 36 about at least one of axes 38 and 39 so that mirror 35 is rotated to the desired set angles.

In an embodiment, controller 22 comprises a memory having stored therein a FOI lookup table (FOI-LUT). The FOI-LUT comprises data that correlates pan and tilt angles of FOI mirror 35 about axes 38 and 39 respectively with corresponding pan and tilt sensor position signals that the pan and tilt angle sensors respectively generate when FOI mirror 35 is oriented at the pan and tilt angles. Controller 22 uses the FOI-LUT to determine what FOI mirror pan and tilt control signals to transmit to gimbal motion controller 23 in response to receiving FOV mirror pan and tilt set input angles instructing controller 22 to what pan and tilt angles to set FOI mirror 35. Optionally, data entries in FOI-LUT are determined in accordance with a calibration procedure discussed below with reference to FIG. 2.

Imaging system 60 comprises a photosensor 61 having an array of pixels 161, schematically shown enlarged in an inset 301, and a principal point 62, an optical system represented by a lens 63 and a FOV light steerer 66 that receives light from a scene, such as zoo scene 200, imaged by range camera 20 and directs the light to the optical system for imaging on the photosensor. Optical system 63 has an optical center 64 and an optical axis 65. A camera coordinate system 70 having an origin coincident with optical center 64, and axes $X_C$, $Y_C$, $Z_C$ that may be used to reference features of imaging system 60. Axis $Z_C$ is optionally coincident with optical axis 65 of optical system 63. To operate CW-TOF camera 20 controller 22 modulate pixels 161 to register reflected light incident on the pixels at an advantageous modulation frequency to determine phase shifts of light reflected by features in the scene relative to modulation of light that the camera transmits to illuminate the scene. The camera may use the phase shifts to determine distances to the features. Controller 22 controls photosensor 61, optical system 63 and FOV light steerer 66 to shape and direct a FOV of range camera 20. In FIG. 1 imaging system 60 is shown configured to have a FOV, schematically outlined by bounding lines 80, which is directed by FOV light steerer 66 to substantially coincide at zoo scene 200 with rectangular region 201 illuminated by illumination system 30 and encompass substantially only region 201.

As in the case of FOI beam steerer 33, FOV light steerer 66 may comprise any one or any combination of more than one, of various light steering elements and is schematically shown comprising a FOV mirror 67 mounted to a FOV gimbal 68, by a suitable mechanical construction represented by a coupling arm 69. Controller 22 may control a FOV gimbal motion controller 24 to rotate FOV mirror 67 about a pan rotation axis 71 and a tilt rotation axis 72 to point a normal 73 to the FOV mirror in a desired direction and thereby to orient FOV mirror 67 in a direction for which range camera 20 collects and images light from a desired region of a scene. Feature of FOV light steerer 66 may be referenced to a mirror coordinate system 75 having coordinate axes $X_{cm}$, $Y_{cm}$, $Z_{cm}$. Optionally normal 73 is coincident with the $Z_{cm}$ axis. Pan and tilt sensors coupled to gimbal 68 generate pan and tilt angle sensor signals that provide measures of pan and tilt angles of gimbal 68 and thereby mirror 67 abut rotation axes 71 and 72.

Gimbal motion controller 24 is optionally similar to motion controller 23 and may comprise piezoelectric motors operable to rotate gimbal 68 about pan and tilt axes 71 and 72 and pan and tilt angle sensors coupled to gimbal 68. The pan and tilt angle sensors generate pan and tilt position signals that provide measures of pan and tilt angles of gimbal 68, and thereby of mirror 67, about rotation axes 71 and 72 respectively. Controller 22 optionally comprises a FOV lookup table (FOV-LUT) that correlates FOV pan and tilt angles of mirror 67 about axes 71 and 72 with corresponding pan and tilt sensor position signals, which the pan and tilt angle sensors coupled to gimbal 68 generate. Controller 22 uses the FOV-LUT to determine pan and tilt sensor control signals to transmit to gimbal motion controller 24 in response to receiving FOV mirror 67 pan and tilt set angles at which to set FOV gimbal 66. Optionally, data entries in FOV-LUT are determined in accordance with the calibration procedure discussed below with reference to FIG. 2.

In FIG. 1, FOI 50 and FOV 80 substantially coincide at ROI 201 in zoo scene 200 and are substantially coextensive with the ROI. Controller 22 controls illuminating and imaging systems 30 and 60 so that a FOI substantially coincides and is coextensive with a FOV of range camera 20 at a scene when controlling the range camera to operate in a ROI focusing operating mode or in a co-scanning operating mode.

In an ROI focusing mode controller 22 may control range camera 20 to acquire a first, "search image" of a scene using a relatively large FOV for use in identifying an ROI in the scene. The search image may, optionally be a relatively low resolution, intensity image of the scene that provides a picture image of the scene rather than a range image of the scene. The ROI may be identified in the picture image manually or automatically. For manual identification of an ROI, controller 22 may display the picture image of the scene on a display screen of range camera 20 so that the user may interact with the search image to indicate the ROI. The user may indicate the ROI by moving a cursor to identify a region of the displayed picture image as the ROI or if the display screen is a touch screen by touching the screen at the location of the ROI. For automatic identification of an ROI, controller 22 may be configured to receive user input that defines a feature of interest in the scene that may be used to identify a ROI. For example, controller 22 may receive user input determining that a feature of interest is a feature of the scene that appears to be moving relative to other features of the scene, or a particular feature, such as a tree, car, human face, or human body. Controller 22 may process the picture image using any of various procedures and/or image processing algorithms to identify the feature of interest and thereby the ROI in the image. For example, controller 22 may use a face recognition algorithm to identify a human face in the search image or look for a blurred region to identify a moving feature in the image.

In an embodiment, the search image may be a range image and a feature identifying the ROI may be a feature at a desired depth in the image. For example, the ROI identifying feature may be a feature that stands out from a background, or a feature that exhibits changing distance from range camera 20 in a sequence of optionally low resolution range images. In an embodiment, both a search picture image and a search range image may be processed by controller 22 to identify a ROI in a scene.

Following identification of the ROI, controller 22 may control illumination system 30 to illuminate substantially only the ROI and imaging system 60 to provide a relatively small reduced FOV that encompasses substantially only the ROI to acquire an image of the ROI. To provide the reduced FOV encompassing the ROI, controller 22 may control FOV gimbal motion controller 24 to rotate FOV mirror 67 to pan and tilt angles for which the FOV substantially centers on the ROI. In addition, controller 22 may control optical system 63 to zoom in on the ROI. To illuminate substantially only the ROI, controller 22 may control optical system 32 to configure light from light source 31 as an appropriately narrow beam of light and control FOI gimbal motion controller 23 to rotate FOI mirror 35 to pan and tilt angles for which the FOI substantially centers on the ROI. If light source 31 comprises a plurality of light providing elements, such as light providing elements 132, controller 22 may turn on some but not all of the light providing elements to produce the narrow beam of light.

In FIG. 1 a feature of interest used to identify ROI 201 is the monkey in the ROI. The monkey may have been manually identified by a user interacting with a displayed search image of scene 200 and/or automatically by controller 22 processing a picture search image and/or a range search image of scene 200. For automatic identification of the monkey controller 22 may process the picture image using a face or body recognition algorithm, or identify the monkey from the monkey's motion antics. Following identification of the monkey, controller 22 may have configured the FOV and FOI of range camera 20 to provide FOV 80 and FOI 50 shown in FIG. 1.

In an embodiment, controller 22 may operate to move a FOV and a coincident FOI that are used to image a ROI in a scene to follow the ROI as a feature of interest in the ROI moves. Controller 22 may determine where to move the FOV and FOI by identifying motion of a feature, hereinafter also referred to as a signature feature that is associated with the feature of interest and may readily be identified in the ROI. For example, a signature feature may be a feature associated with the feature of interest that appears bright in images of the ROI as a result of having a relatively large reflectance for light that illumination system 30 generates to illuminate a scene that range camera 20 images. A signature feature may be an edge of the feature of interest that is readily detectable in images of the ROI with a suitable edge filter.

In the co-scanning operating mode controller 22 controls a FOV and coinciding FOI to simultaneously scan a scene having an area that is larger than an area of the scene that lies within the FOV to acquire an image of the scene. The controller may control illumination and imaging systems 30 and 60 to move the coinciding FOV and FOI to sequentially settle at each of a plurality of different portions of the scene for a settling time having sufficient duration to illuminate and image the portion on photosensor. The image of each portion may be read out from the photosensor in a different frame. After reading out images of all the different portions of the scene controller 22 may stitch the images together to provide a complete range image of the scene.

For example, with reference to FIG. 1, controller 22 may control FOI 50 and FOV 80 to move an area at which they coincide, optionally having a size indicated by the dashed rectangle delimiting ROI 201, sequentially to each of a plurality of different regions of zoo scene 200. At each region controller 22 settles the coinciding FOI 50 and FOV 80 for a settling time sufficient to image the region on photosensor 61 and read out the image. Subsequent to reading out images of the plurality of regions at which FOI 50 and FOV 80 simultaneously settle, controller 22 may stitch the regions to provide a complete image of zoo scene 200.

Figure 2A:
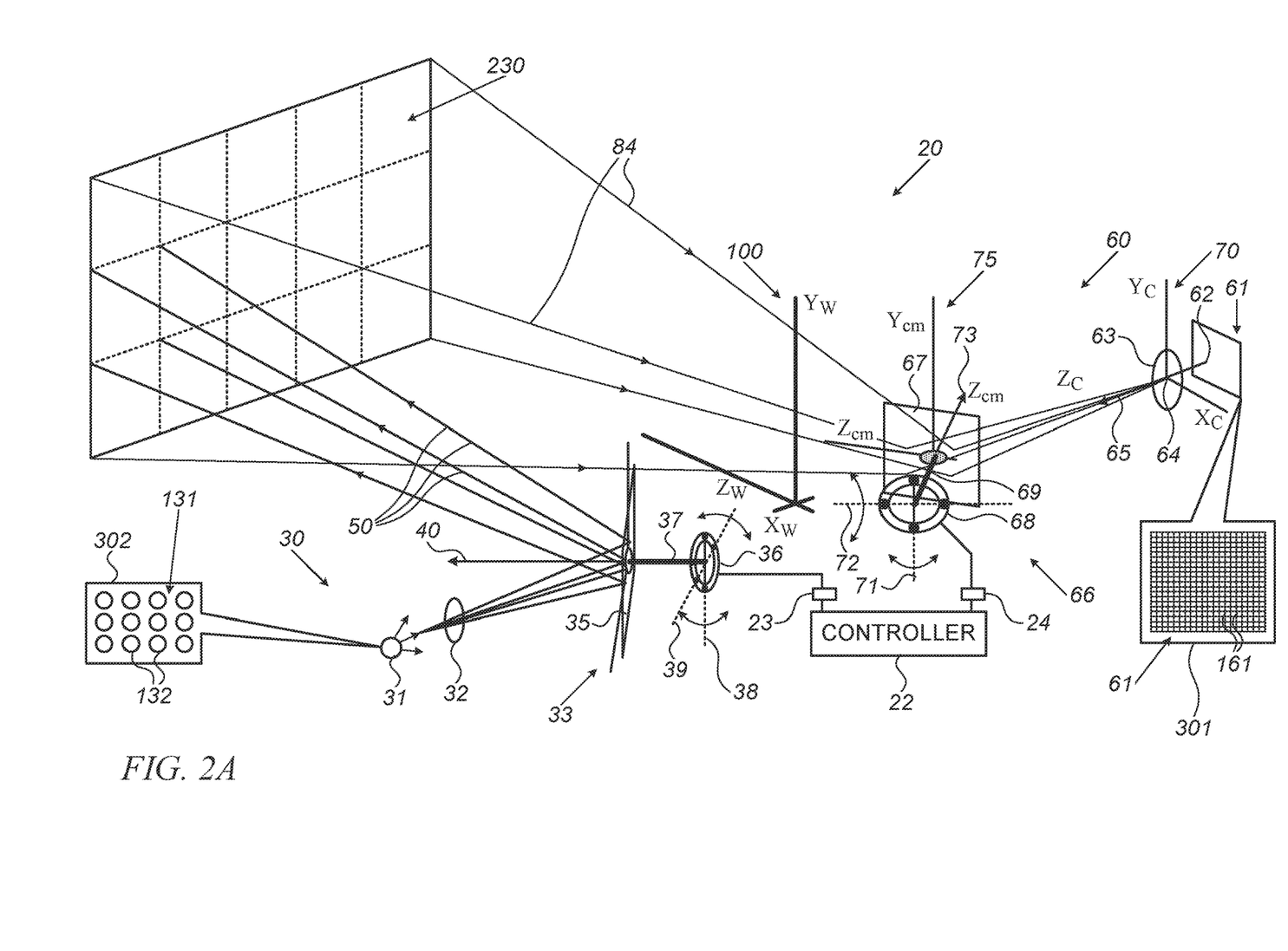
FIGS. 2A and 2B schematically show the range camera shown in FIG. 1 operating in a spotlight operating mode in which a FOI of the camera scans a relatively large FOV of the camera with a relatively small FOI to acquire a complete image of a scene, in accordance with an embodiment of the disclosure.
Figure 2B:
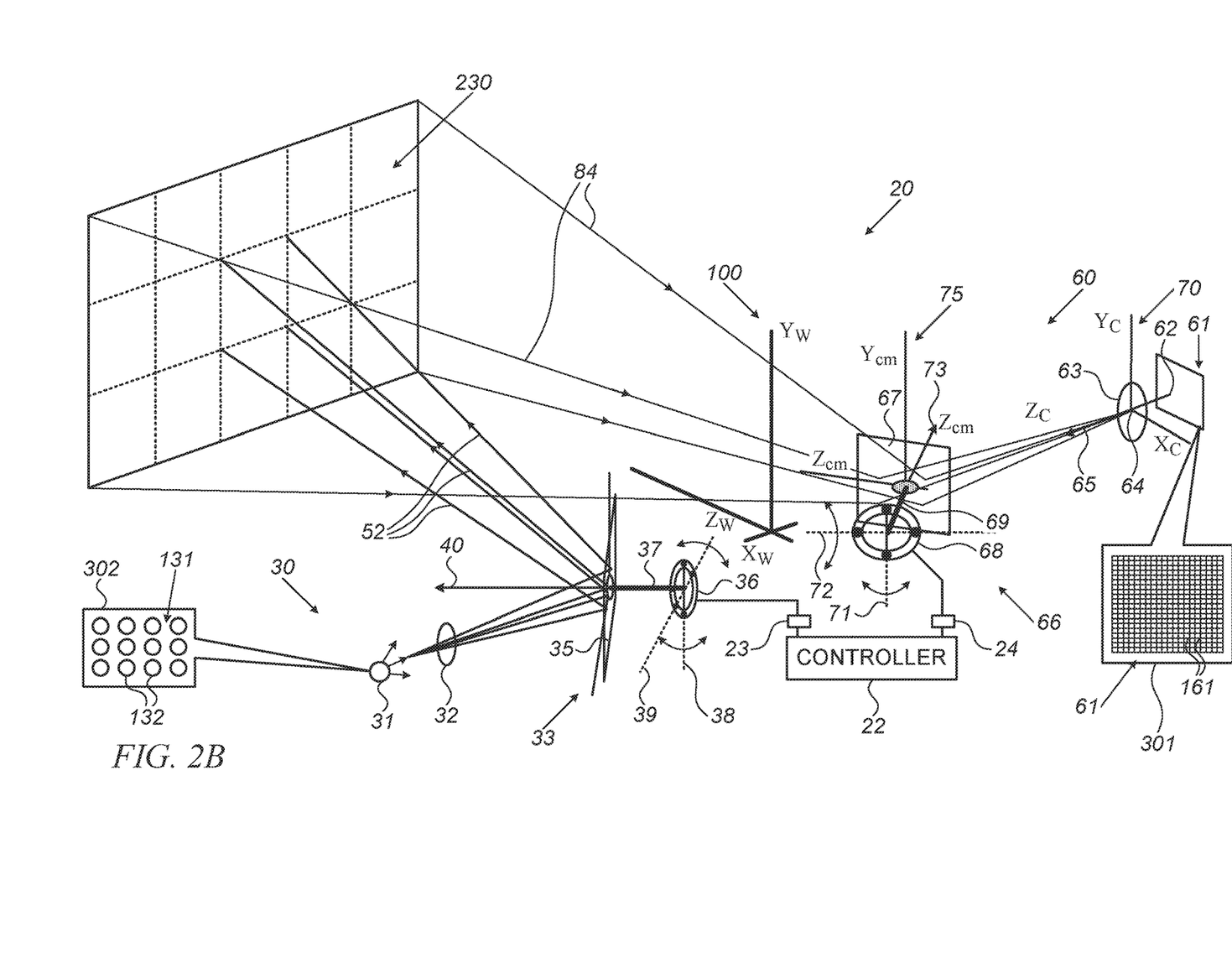

FIGS. 2A and 2B schematically illustrate range camera 20 operating in a spotlight mode.

In a spotlight mode of operation controller 22 controls imaging system 60 to direct a relatively large FOV towards a scene and optionally partitions the scene encompassed by the FOV into component regions. In FIGS. 2A and 2B the scene is represented by a panel 230 partitioned by dashed lines 23 into component regions 232 and the FOV is schematically represented by bounding lines 84. Controller 22 controls illumination system 30 to scan scene 230 with a relatively small FOI having an area at scene 230 equal to about an area of a component region 232. The FOI that illumination system 30 scans over scene 230 is schematically represented by bounding lines 51. When each component region 232 is illuminated by FOI 51, controller 22 controls pixels 161 in photosensor 61 in a portion of the photosensor on which the illuminated component region 232 is imaged to register light reflected by the component region from light transmitted by illumination system 30 in FOI 51. When all the component regions are imaged on their respective associated portions of photosensor 61 controller 22 optionally reads out the photosensor in a single frame to acquire a complete range image of the scene.

In an embodiment controller 22 may operate range camera 20 to acquire a super-resolution image of a scene by rotating gimbal 68 to image the scene on photosensor 61 at a plurality of different poses for which the images are shifted relative to principal point 62 of the photosensor by distances that differ from each other by less than a pitch of the pixels 161 in the photosensor. For pixels 161 having a side length of about 20 μm (micrometers) and a focal length of range camera equal to about 5 mm, gimbal 68 may be rotated by controller 22 by an angle less than or equal to about $2/5000=2\times10^{-3}$ radians to acquire images shifted on the photosensor by about one tenth of a pixel side length. It is noted that an amount by which a feature of a scene imaged on photosensor 61 is shifted by a rotation of gimbal 36 increases as distance from principal point 62 of a pixel 161 on which the feature is imaged increases. If x-y coordinates of a pixel 161 on photosensor 61 are represented by (xp, yp), and coordinates of principal point 62 are represented by $(xp_o, yp_o)$, a rotation of gimbal 68 by an angle a shifts an image of a feature imaged on the pixel by an amount equal to about $\alpha[|(xp-xp_o)(yp-yp_o)|/f]$ where f is a focal length of range camera 20.

To provide the data in the FOI-LUT and FOV-LUT that enable controller 22 to execute the imaging procedures described above, range camera 20 may be calibrated by acquiring picture images of a suitable calibration target. The picture images may be processed using any of various appropriate calibration procedures to calibrate pan and tilt sensor position signals provided by sensors coupled to gimbals 36 and 68 with directions of FOVs and FOIs provided by imaging and illumination systems 30 and 60.

FIG. 3 schematically shows active illumination range camera 20 imaging a calibration target 220 that may be used to calibrate the range camera imaging system 60 in accordance with an embodiment of the disclosure. Calibration target 220 optionally comprises a checkerboard pattern that provides an array of rows and columns of checkerboard corners 221 that may function as calibration fiducial markings. Range camera 20 is shown imaging the calibration target 220 with a relatively large FOV schematically indicated by bounding lines 82.

Let an i-th fiducial (an i-th corner 221) have real world coordinates $x_w(i)$, $y_w(i)$, $z(i)_w$ in coordinate system 100. Coordinates $x_w(i)$, $y_w(i)$, $z(i)_w$ may be represented as a vector $x_w(i)$ where bold italics script is used to represent a vector. Assume that gimbal 68 has been rotated about pan and tilt rotation axes 71 and 72, so that pan and tilt angle sensors provide pan and tilt sensor position signals PS(j) and TS(j), which correspond to unknown pan and tilt angles φ(j) and θ(j) respectively. Relative to mirror coordinate system 75, having coordinate axes $X_{cm}$, $Y_{cm}$, $Z_{cm}$ let rotation axes be located at distances $v_{71}$ and $v_{72}$ from the origin of coordinate system 75 and have direction cosines defined by unit norm vectors $\omega_{71}$ and $\omega_{72}$. Let $d_{cm}$ represent distance of the plane of mirror 67 from the origin of coordinate system 75, and for pan and tilt angles φ(j) and θ(j), $\eta_{cm}(j)$ the unit vector normal to the mirror plane. Then if $\Pi_{cm}(j)$ represents the 4-vector= $[\eta_{cm}(j),d_{cm}]$ the plane of mirror 67 in mirror coordinate system 75 satisfies an equation $\hbar_{cm}(j)\cdot[x_{cm},1]=0$, where $x_{cm}$ represents the components in coordinate system 75 of any point on the plane of mirror 67 and "·" indicates the dot or scalar product.

For pan and tilt angles φ=0 and θ=0 about pan and tilt rotation axes 71 and 72 respectively let a transform that transforms homogenous coordinates of a point referenced to camera coordinate system 70 to homogenous coordinates referenced to mirror coordinate system 75 be represented by the partitioned matrix $$g(c, cm(0)) = \begin{bmatrix} R(c, cm) & T(c, cm) \\ 0 & 1 \end{bmatrix},$$

where R(c,cm) represents a rotation matrix and T(c,cm) a translation vector. Following rotation of gimbal 68 to pan and tilt angles φ(j) and θ(j), g(c, cm) may be given by an expression:

$$g(c, cm(j)) = \begin{bmatrix} R(\omega_{71}, \phi(j)) & T(\omega_{71}, \phi(j), v_{71}) \\ 0 & 1 \end{bmatrix}$$
$$\begin{bmatrix} R(\omega_{72}, \theta(j)) & T(\omega_{72}, \theta(j), v_{72}) \\ 0 & 1 \end{bmatrix} \begin{bmatrix} R(c, cm) & T(c, cm) \\ 0 & 1 \end{bmatrix}$$

And in in the camera coordinate system 70 the vector that parametrizes the plane of mirror 67 becomes $\Pi_c(j)=[\eta_c(\phi(j)), \theta(j)),d_c(\phi(j), \theta(j))]=[\eta_c(j),d_c(j)]=g(c, cm)^{-1}\Pi_{cm}$ Let a transform that transforms homogenous coordinates of a point referenced to world coordinate system 100 to homogenous coordinates referenced to mirror coordinate system 75 be represented by the matrix $$g(c, w) = \begin{bmatrix} R_O(c, w) & T_O(c, w) \\ 0 & 1 \end{bmatrix}.$$

However, imaging system 60 images feature of a scene after reflection in FOV mirror 67. As a result, to imaging system 60, an i-th feature of a scene having real world coordinates represented by a 4-vector $[x_w(i),1]$ appears to have coordinates in coordinate system 75 that are transformed in accordance with a transformation that includes a reflection in mirror 67 after transformation by g (c,w). Let reflection in mirror 67 be represented by a transform $P(\Pi_c(j))\equiv P(\eta_c(j), d_c(j))\equiv P(j)$, defined by an expression:

$$P(j) = \begin{bmatrix} (I - 2\eta_C(j)\eta_C(j)^T) & 2d_C(j)\eta_C(j) \\ 0 & 1 \end{bmatrix},$$

where I is the 3×3 identity matrix. Then for pan and tilt angles φ(j), θ(j), a given feature in a scene having real world coordinates $[x_w(i),1]$ imaged by imaging system 60 has, "reflected", "virtual" coordinates $[x_c(i,j)1]^T=P(j)g(c, w)[x_w(i),1]T$ in coordinate system 75. The given feature is therefore imaged by imaging system 60 responsive to its virtual coordinates $[x_c(i,j)1]$ onto photosensor 61 to projected, two dimensional, pixel coordinates xp'(i,j)=(xp'(i,j),yp'(i,j)) by a camera projection function. If the camera projection function is represented by $f([x_c(i,j)1])$, then xp'(i,j)=(xp'(i,j),yp'(i,j))=f([x_c(i,j),1]).

For any given set of pan and tilt sensor position signals PS(j) and TS(j), the variables $\omega_{71}, v_{71}, \omega_{72}, v_{72}$, g(c, w), $\Pi_{cm}(j)$, φ(j), and θ(j) are unknown. The variables may be determined by minimizing a suitable cost function using the real world coordinates of fiducials 221 imaged by range camera 20 in picture images of calibration target 220 acquired for a plurality of different pairs of PS(j) and TS(j) and their associated an and tilt angles φ(j), and θ(j). Assume that range camera 20 is controlled to acquire images of calibration target 220 for each of J different pairs of values PS(j) and TS(j) and for a j-th image of calibration target 221 N(i,j) fiducials are imaged.

For a given set of pan and tilt angles φ(j), θ(j), assume that NI(j) fiducials 221 on calibration target 200 are imaged in an image of the calibration target acquired by range camera 200. Let xp*(i,j)=(xp*(i,j), yp*(i,j)) represent the actual pixel coordinates on photosensor 61 of an image acquired for pan and tilt sensor position signals PS(j) and TS(j) of an i-th fiducial 221 of the NI(j) fiducials imaged in the image of the calibration target. Let the i-th fiducial have real world coordinates $x_w(i)$. Values for the unknown variables may be determined by determining values that minimize a sum $\Sigma_{j=1}^{j=J} \Sigma_{i=1}^{i=NI(j)} |xp^*(i,j) - xo'(i,j)|^2$.

The determined values define for each set of pan and tilt sensor position signals PS(j) and TS(j) rotation translation transform g(c, w) and parity transform P(j). If a vector coincident with optical axis 65 of imaging system 60 is represented by OA in coordinate system 75, for the sensor position signals PS(j) and TS(j) an image OA(j) of the optical axis in real world coordinate system 100 is a vector that may be determined by an expression: OA(j)=g(c, w)PS(j)[OA, 1]. The image OA(j) defines where in the real world the FOV of range camera 20 is pointing for sensor position signals PS(j) and TS(j) and their associated respective pan and tilt angles $\phi(j)$, $\theta(j)$ and provides the data for the FOV-LUT comprised in the range camera.

Data for FOI-LUT may be determined by controlling illumination system 30 to illuminate calibration target 221 for rotation about pan and tilt rotation axes 38 and 39 of gimbal 36 for each of a plurality of different pairs of pan and tilt angles. Optionally at each pair of pan and tilt angles, for which illumination system 30 illuminates calibration target 221, the illumination system is controlled to illuminate the calibration target using a relatively small FOI so that a relatively small area of the calibration target is illuminated. For each pair of pan and tilt angles and their associated pan and tilt sensor position signals that sensors coupled to gimbal 36 generate, imaging system 60 is controlled to image calibration target 220. Optionally, each image is processed to determine a centroid of the region of the calibration target that is illuminated by the FOI. The location of the centroid and a distance of the centroid from range camera 20 may be used to provide a vector, which may be referred to as a FOI axis vector, along which the FOI points for the pan and tilt sensor position signals of gimbal 36 associated with the image. In an embodiment the distance to the centroid may be determined from a range image of the calibration target. The FOI axis vectors and associated pan and tilt sensor position signals may be used to provide the data for the FOI-LUT, in accordance with an embodiment of the disclosure.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. An active illumination range camera operable to determine distances to features in a scene, the range camera comprising:

an illumination system controllable to generate different fields of illumination (FOI) to illuminate a scene imaged by the range camera and to direct a FOI generated by the illumination system selectively in different directions to illuminate the scene;

an imaging system comprising a photosensor having light sensitive pixels, the imaging system controllable to generate different fields of view (FOV) and to direct a FOV generated by the imaging system selectively in different directions to image the scene on the photosensor; and a controller operable to control the illumination and imaging systems so that the FOI and FOV are coextensive and coincide at the scene, the controller further operable to identify a region of interest (ROI) in a portion of the scene and to control the illumination and imaging systems to focus the FOI to generate a beam of light that illuminates only the ROI and acquire an image of the ROI using an adjusted FOV coextensive with the FOI at the scene, the image acquired of only the ROI using the adjusted FOV, wherein the controller is further operable to control the light sensitive pixels in the photosensor in a portion of the photosensor on which an illuminated component region is imaged to register light reflected by the illuminated component region, the illuminated component region corresponding to the ROI.

2. The range camera according to claim 1 wherein the illumination system comprises a light source and optical system controllable to produce a beam of light configured to provide the FOI and a beam steerer controllable to receive and steer the beam of light to steer the FOI selectively in different directions, and wherein after a preset time interval, the controller is further operable to control the imaging system to scan the FOV to determine changes in the ROI.

3. The range camera according to claim 1 wherein the illumination system comprises an array of light producing elements that are independently controllable to shape the beam of light, and the controller is further operable to control the illumination to zoom in on the ROI.

4. The range camera according to claim 3 wherein the beam steerer comprises:

a FOI gimbal rotatable about a pan axis and about a tilt axis;

a FOI mirror mounted to the gimbal; and at least one FOI sensor configured to generate pan and tilt position signals that provide measures of pan and tilt angles to which the FOI gimbal is rotated about the pan and tilt axes respectively;

wherein the controller is configured to control the FOI gimbal based on the pan and tilt position signals to selectively rotate about the pan and tilt axes so that the FOI mirror steers the FOI in a desired direction.

5. The range camera according to claim 4 and comprising a FOI lookup table (FOI-LUT) having data that correlates directions in which the FOI is directed by the FOI mirror with pan and tilt angle position signals that the at least one FOI sensor generates and wherein the controller is configured to:

receive signals indicating a desired FOI direction in which to direct the FOI;

access the FOI-LUT to determine pan and tilt angle signals correlated with the desired FOI direction; and use the determined pan and tilt angle position signals to rotate the FOI gimbal so that the FOI mirror directs the FOI in the desired direction.

6. The range camera according to claim 1 wherein the imaging system comprises:
   a light steerer configured to receive light from a scene that the range camera images; and
   an optical system configured to receive light from the light steerer that the light steerer receives from the scene;
   wherein the optical system and photosensor are configured to provide the FOV and the light steerer configured to steer the FOV in a desired direction.

7. The range camera according to claim 6 wherein the light steerer comprises:
   a FOV gimbal rotatable about a pan axis and about a tilt axis;
   a FOV mirror mounted to the FOV gimbal; and
   at least one FOV sensor configured to generate pan and tilt position signals that provide measurements of pan and tilt angles to which the FOV gimbal is rotated about the pan and tilt axes respectively;
   wherein the controller is configured to control the FOV gimbal based on the pan and tilt position signals provided by the at least one FOV sensor to selectively rotate about the pan and tilt axes so that the FOV mirror steers the FOV in a desired direction.

8. The range camera according to claim 7 and comprising a FOV lookup table (FOV-LUT) having data that correlates directions in which the FOV is directed by the FOV mirror with pan and tilt angle position signals that the at least one FOV sensor generates and wherein the controller is configured to:
   receive signals indicating a desired FOV direction in which to direct the FOV;
   access the FOV-LUT to determine pan and tilt angle signals correlated with the desired FOV direction; and
   use the determined pan and tilt angle position signals to rotate the FOV gimbal so that the FOV mirror directs the FOV in the desired direction.

9. The range camera according to claim 1 wherein the controller is operable to:
   control the imaging system to acquire a first image of the scene using a first FOV;
   control the illumination system to generate the FOI that illuminates only the ROI;
   control the imaging system to acquire an image of the ROI using a second FOV coextensive with the FOI at the scene.

10. The range camera according to claim 9 wherein the controller is configured to identify a feature of interest comprised in the ROI to identify the ROI.

11. The range camera according to claim 10 wherein the controller is configured to move the FOI and FOV to simultaneously coincide and move with the ROI based on movement of the feature of interest.

12. The range camera according to claim 1 wherein the controller is operable to:
   control the illumination and imaging systems to configure the FOI and the FOV so that the FOI and the FOV are coincident at the scene;
   simultaneously move the coincident FOI and FOV to sequentially illuminate and image each of a plurality of different regions of the scene; and
   stitch the images to provide a panorama range image of the scene.

13. The range camera according to claim 12 wherein the controller is configurable to read out images of at least two of the plurality of images of the different regions in a single frame of the photosensor.

14. The range camera according to claim 12 wherein the controller is configurable to read out each image of a region of the plurality of different regions in a different frame of the photosensor.

15. The range camera according to claim 1 wherein the controller is operable to:
   control the illumination and imaging systems to configure the FOI and the FOV so that the FOI and the FOV are coincident at the scene;
   simultaneously move the coincident FOI and FOV to acquire an image of the scene from each of a plurality of different poses; and
   process the images to provide a super-resolution image of the scene.

16. The range camera according to claim 15 wherein images of the scene acquired at two different poses are shifted relative to a principal point of the photosensor by distances that differ from each other by less than a pitch of the pixels in the photosensor.

17. The range camera according to claim 1, wherein the controller is further operable to acquire the image of only the ROI using the adjusted FOV, the adjusted FOV being a reduced FOV that encompasses only the ROI.

18. The range camera according to claim 1 wherein the controller is further operable to control a plurality of light providing elements to narrow the beam of light by turning on less than all of the plurality of light providing elements.

19. The range camera according to claim 1 wherein the range camera comprises at least one or any combination of a gated time of flight (GT-TOF) range camera, continuous wave time of flight (CW-TOF) range camera, a stereo range camera, a structured light range camera.

20. A computerized method for determining distances to features in a scene, the computerized method comprising:
   controlling an illumination system to generate different fields of illumination (FOI) to illuminate a scene imaged by a range camera and to direct a FOI generated selectively in different directions to illuminate the scene;
   controlling an imaging system comprising a photosensor having light sensitive pixels to generate different fields of view (FOV) and to direct a FOV generated by the imaging system selectively in different directions to image the scene on the photosensor;
   controlling the illumination and imaging systems so that the FOI and FOV are coextensive and coincide at the scene;
   identifying a region of interest (ROI) in a portion of the scene;
   controlling the illumination and imaging systems to focus the FOI to generate a beam of light that illuminates only the ROI and acquire an image of the ROI using an adjusted FOV coextensive with the FOI at the scene, the image acquired of only the ROI using the adjusted FOV; and
   controlling the light sensitive pixels in the photosensor in a portion of the photosensor on which an illuminated component region is imaged to register light reflected by the illuminated component region, the illuminated component region corresponding to the ROI.

21. A controller having one or more computer storage media having computer-executable instructions for determining distances to features in a scene that, upon execution by a processor, cause the processor to at least perform an automated alignment process to:
   controlling an illumination system to generate different fields of illumination (FOI) to illuminate a scene imaged by a range camera and to direct a FOI generated by an illumination system selectively in different directions to illuminate the scene;

control an imaging system comprising a photosensor having light sensitive pixels to generate different fields of view (FOV) and to direct a FOV generated by the imaging system selectively in different directions to image the scene on the photosensor;

control the illumination and imaging systems so that the FOI and FOV are coextensive and coincide at the scene;

identify a region of interest (ROI) in a portion of the scene; and control the illumination and imaging systems to focus the FOI to generate a beam of light that illuminates only the ROI and acquire an image of the ROI using an adjusted FOV coextensive with the FOI at the scene, the image acquired of only the ROI using the adjusted FOV, and control the light sensitive pixels in the photosensor in a portion of the photosensor on which an illuminated component region is imaged to register light reflected by the illuminated component region, the illuminated component region corresponding to the ROI.

\* \* \* \* \*